(12) United States Patent
Rewis et al.

(10) Patent No.: US 10,980,163 B2
(45) Date of Patent: Apr. 20, 2021

(54) STALK PULLER

(71) Applicants: Matthew Rewis, Tifton, GA (US);
Charles Sumner, Chula, GA (US);
Bennie G Branch, Jr., Tifton, GA (US)

(72) Inventors: Matthew Rewis, Tifton, GA (US);
Charles Sumner, Chula, GA (US);
Bennie G Branch, Jr., Tifton, GA (US)

(73) Assignee: Kelley Manufacturing Company, Inc., Tifton, GA (US)

( * ) Notice: Subject to any disclaimer, the term of this patent is extended or adjusted under 35 U.S.C. 154(b) by 341 days.

(21) Appl. No.: 15/901,836

(22) Filed: Feb. 21, 2018

(65) Prior Publication Data

US 2018/0242507 A1   Aug. 30, 2018

Related U.S. Application Data

(60) Provisional application No. 62/464,258, filed on Feb. 27, 2017.

(51) Int. Cl.
| | | |
|---|---|---|
| *A01B 43/00* | (2006.01) | |
| *A01D 34/835* | (2006.01) | |
| *A01D 43/00* | (2006.01) | |
| *A01D 46/08* | (2006.01) | |
| *A01D 43/12* | (2006.01) | |
| *A01D 34/44* | (2006.01) | |
| *A01B 29/04* | (2006.01) | |

(52) U.S. Cl.
CPC .......... *A01B 43/00* (2013.01); *A01D 34/8355* (2013.01); *A01D 43/00* (2013.01); *A01D 43/12* (2013.01); *A01D 46/08* (2013.01); *A01B 29/04* (2013.01); *A01D 34/44* (2013.01)

(58) Field of Classification Search
CPC ......... A01C 5/066; A01B 43/00; A01B 29/04; A01B 39/18; A01B 15/16; A01B 15/18; A01B 21/08; A01B 21/083; A01B 21/086; A01B 23/06; A01B 33/024; A01B 35/16; A01B 35/28; A01B 39/08; A01B 41/04; A01B 5/00; A01B 5/04; A01B 7/00; A01G 23/06; A01D 43/00; A01D 43/12; A01D 43/10; A01D 34/8355; A01D 34/44; A01D 46/08; A01D 42/04; A01D 25/00–048

See application file for complete search history.

(56) References Cited

U.S. PATENT DOCUMENTS

| | | | |
|---|---|---|---|
| 3,678,671 A | | 7/1972 | Scarnato |
| 3,770,064 A | | 11/1973 | Scarnato |
| 3,815,266 A | * | 6/1974 | Schmitz ............... A01G 23/062 37/302 |

(Continued)

*Primary Examiner* — Adam J Behrens
(74) *Attorney, Agent, or Firm* — Laurence P. Colton; Smith Tempel Blaha LLC

(57) ABSTRACT

A stalk puller to be used with or without a mower/shredder utilizes a pair of independently mounted discs converging along their lower edge to grasp and pull stalks from the ground as the stalk puller is moved down the row by a prime mover. At least one of the discs is urged against the other by a spring such that the associated disc may allow rocks and debris to pass between the discs without damage. The spring mounting reduces adjustments due to normal wear as well as damage from debris.

24 Claims, 6 Drawing Sheets

(56) References Cited

U.S. PATENT DOCUMENTS

| | | | | |
|---|---|---|---|---|
| 3,898,752 A * | 8/1975 | Ulve | A01G 23/062 |
| | | | 37/302 |
| 3,946,681 A * | 3/1976 | Sylvester | A01B 49/04 |
| | | | 111/124 |
| 4,015,667 A | 4/1977 | Ruozi | |
| 4,295,532 A * | 10/1981 | Williams | A01C 5/064 |
| | | | 111/139 |
| 4,483,401 A * | 11/1984 | Robertson | A01C 7/006 |
| | | | 172/574 |
| 4,751,812 A | 6/1988 | Lubetzky | |
| 4,779,684 A * | 10/1988 | Schultz | A01B 35/18 |
| | | | 171/62 |
| 4,921,050 A | 5/1990 | Brown | |
| 5,467,828 A | 11/1995 | Ruozi | |
| 5,482,120 A * | 1/1996 | Lloyd | A01B 41/04 |
| | | | 172/21 |
| 5,953,895 A | 9/1999 | Hobbs | |
| 6,068,061 A * | 5/2000 | Smith | A01B 13/08 |
| | | | 172/139 |
| 6,185,919 B1 | 2/2001 | Borchard | |
| 8,393,407 B2 * | 3/2013 | Freed | A01B 35/16 |
| | | | 111/141 |
| 10,429,080 B2 * | 10/2019 | Pasqual | F24C 7/088 |
| 2004/0256122 A1 * | 12/2004 | Roibier | A01B 63/26 |
| | | | 172/307 |
| 2014/0196430 A1 | 7/2014 | Windhausen | |
| 2018/0263174 A1 * | 9/2018 | Hodel | A01C 5/066 |

\* cited by examiner

STALK PULLER

This application claims priority from U.S. Provisional Patent Application Ser. No. 62/464,258, entitled STALK PULLER filed on Feb. 27, 2017 which is incorporated herein for all purposes.

FIELD OF INVENTION

The present invention relates to a farming implement used to clear fields of stalks after crops have been harvested therefrom.

BACKGROUND

Cotton stalks have always created a problem for farmers after harvest. After cotton is harvested, the stalks remain as an undesired after product that farmers have to deal with. The stalks are undesired because they harbor unwanted pests, are slow to deteriorate, and can damage equipment. In history, the boll weevil almost destroyed all cotton production. It was discovered that the boll weevil would harbor in cotton stalks over winter. One method of fighting back against the boll weevil was to completely destroy the stalks after harvest. This was one part of the Boll Weevil Eradication Program that was instituted to wipeout the boll weevil. While the boll weevil is no longer a major threat to most of the United States, many farmers still want to take preventive action against it. Another problem is that the root of the cotton stalk will also harbor nematodes. The combination of these two pests makes it desirable to destroy the stalks and dislodge the root from the ground.

The cotton stalk, if left whole, deteriorates at a slow pace. If the stalk is shredded it increases the rate of deterioration. When cotton stalks do not deteriorate, they create problems for field operations in following seasons. Problems include stalks hanging on ripper points or planters and creating an undesired furrow. If the cotton stalk tops are mowed or shredded and not completely pulled, the remaining stalk can cause excessive wear and punctures on tractor and equipment tires. If the stalks are not mowed they can catch loose wires or hoses on the tractor and implement and break them.

Various attempts to deal with the problems exist in the prior art. One prior art machine has two rubber tire pullers that are driven by a ground contact cutter drum in the rear. This apparatus has many limitations. If the soil is too wet it can stick to the cutter drum making the drum into a large ball, rendering the cutter useless. If the soil is too dry, it will break the stalk off near the ground and not pull it. The machine also leaves the field in a rough condition. When follow up operations are performed behind this, it is a very rough ride for the operator consequently ground speeds are reduced. It is also a very heavy machine, which requires a larger tractor to pull it. The size of the remaining debris is also a concern for many farmers. It leaves the stalks too long and creates dragging issues on tools that run after this machine.

A similar device has an undercutting blade ahead of the ground contact cutter drum. One major problem farmers have with this unit is the blade that runs under the stalks disturbs too much soil creating erosion problems. The undercutting blades also leave the soil loose in front on the cutting drum. The loose dirt does not create a firm enough counter shear for the cutter drum and the stalk is not always cut. The cutter drum on this unit has the same problem as the first mentioned unit when running in wet conditions. The cutter drum will ball up.

There are other methods that can achieve a desired result, but require multiple operations. One of these methods is to run a shredder and shred the stalks leaving the root in the ground. A second pass is required by either a disc puller or a disc harrow to remove the root. In this situation, the pullers disturb less soil and perform better, however this method creates at least two trips through the field and consumes more fuel.

Prior art designs for disc pullers require much maintenance. The two discs have to keep proper tension between them to firmly grasp the stalks while removing them. If the proper tension is not kept the discs will slip on the stalk and not pull them. Since the discs wear as they are used, the tension needs to be adjusted multiple times, often daily. The other major problem with the disc pullers is they are rigid. Consequently, when a large stalk or other large debris is forced into the pinch point between the discs it causes the discs or discs arms to flex creating an excessive shock load on the bearings. For example, rocks encountered by the disc puller at the pinch point can damage the blades or the bearing. This leads to premature bearing or machine failure. One additional problem with these pullers is that they have poor depth control in that the drive paddles commonly attached to the back of the discs are not alone sufficient for accurate depth control. The issue with this is in soft ground the discs will disturb too much soil.

SUMMARY OF THE INVENTION

A general object of the invention is to reduce the problems caused by leaving crop stalks and roots standing and intact in the field after harvest.

A further object of the invention is to provide a stalk puller that is self-adjusting;

Yet another object of the invention is to provide a stalk puller that is not subject to damage from rocks and debris engaged by the discs.

A further object of the invention is to reduce the disruption of the soil by the stalk puller;

A still further object of the invention is to incorporate the improved stalk puller into a single pass machine.

BRIEF DESCRIPTION OF THE DRAWINGS

Referring to the drawings which are appended hereto and which form a portion of this disclosure, it may be seen that.

DETAILED DESCRIPTION

Figure 1:
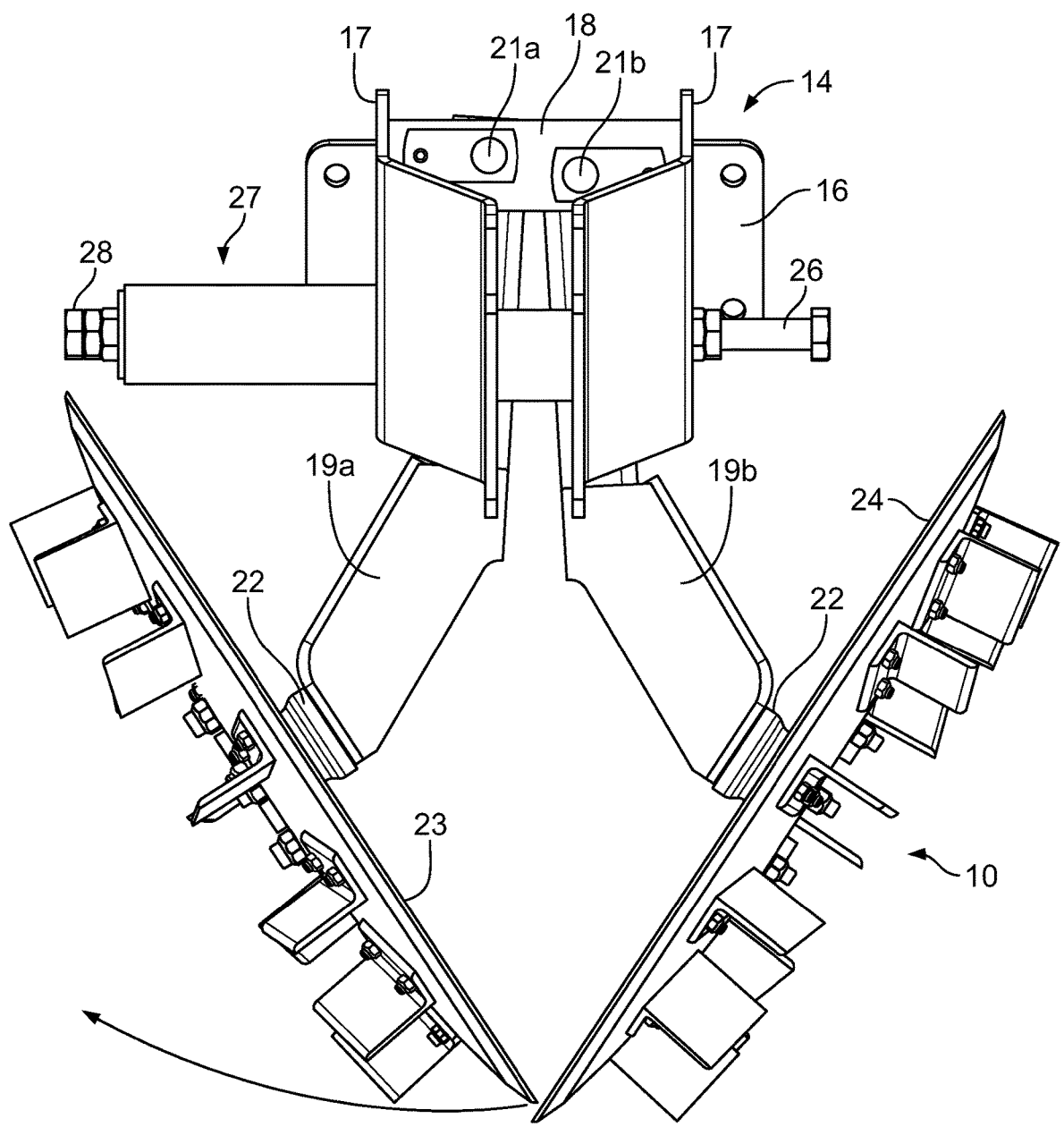
FIG. 1 is a front elevation view of a stalk puller.
Figure 2:
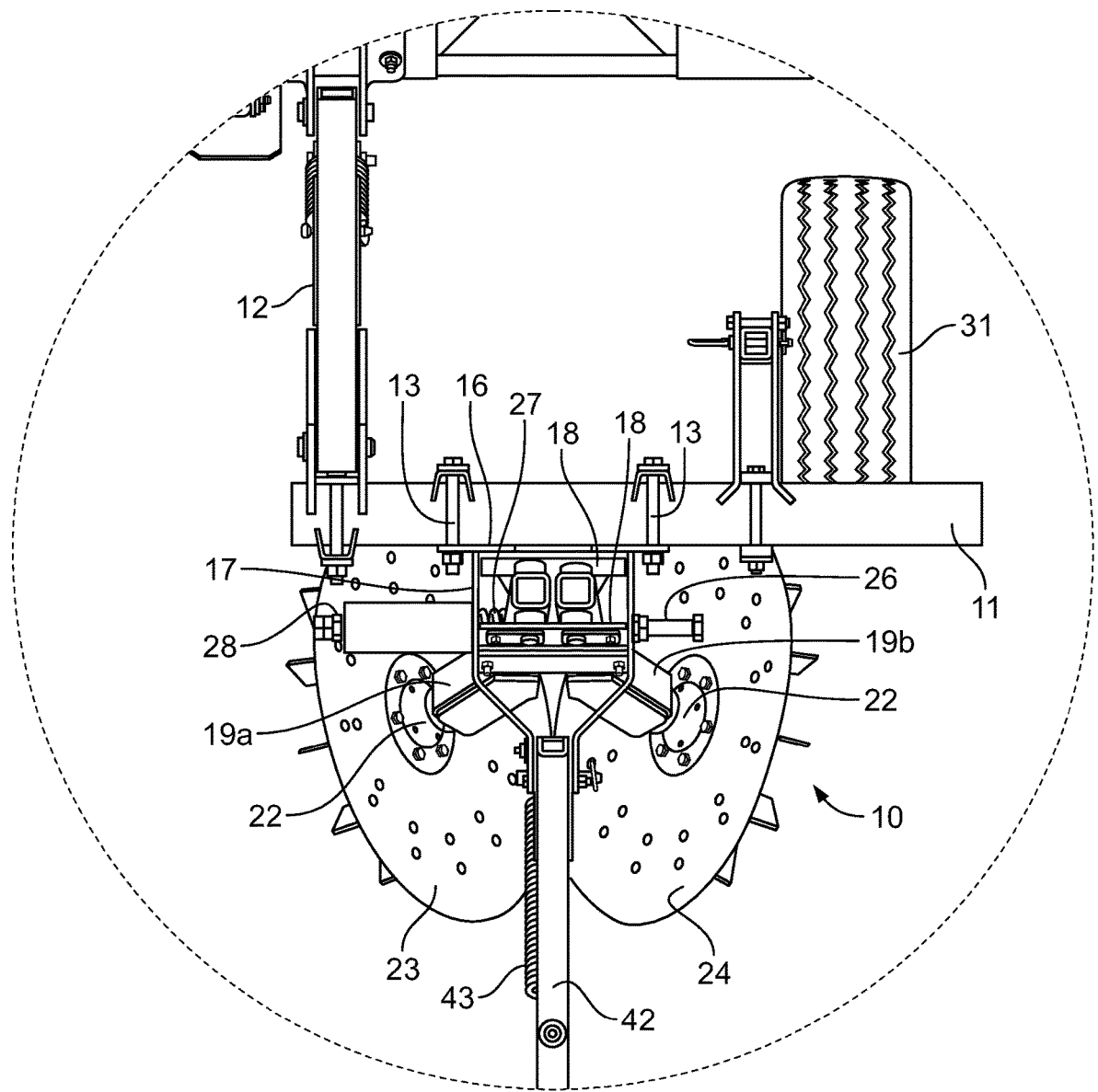
FIG. 2 is a top plan view of one embodiment of our stalk puller.
Figure 3:
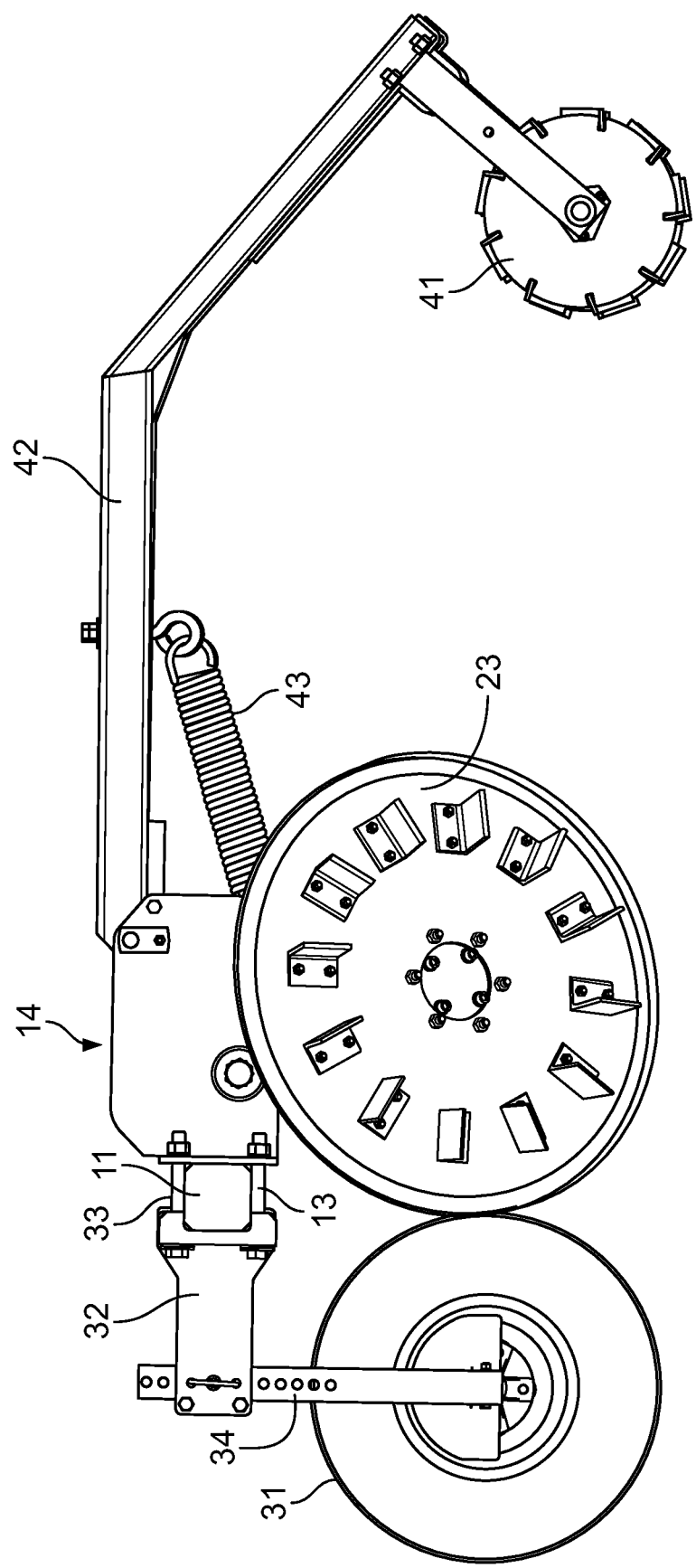
FIG. 3 is a side elevation view of the puller-guide wheel-roller assembly.

Referring to the drawings for a clearer understanding of the invention, note in FIGS. 1 to 3 our improvement is connects to a tool bar 11 extending transversely to the direction of travel an associated prime mover or tractor (not shown). The tool bar 11 is connected to a parallel linkage 12 such as disclosed in U.S. patent application Ser. No. 14/205,796, which is incorporated herein by reference, which connect to the forward machinery. Connected to the tool bar 11 by conventional U bolts 13 is a weldment 14 other mounting structure that supports and is incorporated into our improved disc puller 10. Weldment 14 includes a forward plate 16, pair of vertical sidewalls 17 extending rearward from forward plate 16, and a pair of cross braces 18 extending between sidewalls 17 and spaced apart from each other. Cross braces 18 support a pair of disc arms 19*a* and 19*b* on a pair of pivot pins 21. Each disc arm includes an upper generally vertical section and a lower angled section such that the lower sections of 19*a* and 19*b* diverge. A disc hub connection 22 is mounted at the lower end of each disc arm 19*a* and 19*b* to support a pair of rotatable discs 23 and 24 which engage the plant stalks.

Disc arm 19*b* supporting rotatable disc 24 is maintained in a centered position relative to the weldment by adjustment bolt 26. Disc arm 19*a* supporting rotatable disc 23 is influenced by compression spring 27 under tensioning control of tension bolt 28. As will be seen in FIG. 3 disc arm 19*a* is mounted slightly higher than disc arm 19*b* such that the peripheral edge of disc 23 bears against the concave surface of disc 24 near the edge of disc 24. Note that the same configuration of the disc edges may be achieved by making disc arm 19*a* shorter than disc arm 19*b*. The adjustment bolt 26 is used to keep the pinch point of the discs 23 & 24 centered on the crop row. The amount of force urging disc 23 against disc 24 from compression spring 27 is controlled by tensioning bolt 28 to vary the amount of force between the discs 23 and 24. It will be understood that the disc rotate due movement of prime mover causing interaction with the soil and stalks such that the discs momentarily grasp the stalks and pulling them forwardly as the prime mover pulls the discs over the ground. Further forward movement causes the discs to rotate and diverge from the stalk releasing it to the ground. When a rock or an excessively large stalk is encountered the spring 27 allows disc 23 and arm 19*a* to move laterally along the arrow shown in FIG. 1 to avoid damage.

The disk pullers were designed to correct the problems of the prior art disc pullers. The compression spring 27 eliminates the constant adjustment of the puller discs 23 and 24 and allows large objects to pass through the convergence of discs 23 and 24 without damaging the unit. Also, the action of the compression spring 27 is such that as the discs wear the change of force applied to the disc 23 is minor. It may also be understood that both disc arm 19*a* and 19*b* may be spring biased in the same manner if so desired.

Another unique feature is that the cutting depth of the discs is controlled by a gauge wheel 31. The gauge wheel 31 prevents the discs 23 & 24 from disturbing more soil than is necessary to dislodge the stalks from the ground. The gauge wheel 31 may be incorporated into the individual stalk puller or may be mounted adjacently using tool bar 11 as shown in FIGS. 1 & 2. Referring to FIG. 3 it may be more clearly seen that gauge wheel 31 is connected to tool bar 11 by a bracket 32 and cooperative U bolts 33. Bracket 32 cooperative receives an adjustable wheel leg 34 that carries a conventional axle for gauge wheel 31. Wheel leg 34 allows for incremental adjustment of gauge wheel 31 relative to tool bar 11 and thus to stalk puller 10 to control the depth of engagement with discs 23 & 24. As may be seen in FIG. 3, the stalk puller 10 may be coupled with the gauge wheel 31 and a roller basket 41 for use after the field has been cleared of the crop. Roller basket 41 is also mounted to tool bar 11 using a clevis like attachment to weldment 14 and an extension arm 42 biased toward the ground by a spring 43 mounted between extension arm 42 and the weldment 14. It will be appreciated that the extension arm could be attached separately to the tool bar 11 or the roller basket 41 may be ganged with other roller baskets behind additional stalk pullers. The roller basket 41 finishes the field off to leave it smoother and removes excess soil from the root ball. The arrangement shown in FIG. 3 is a standalone unit, with the mowing operation conducted separately.

Figure 4:
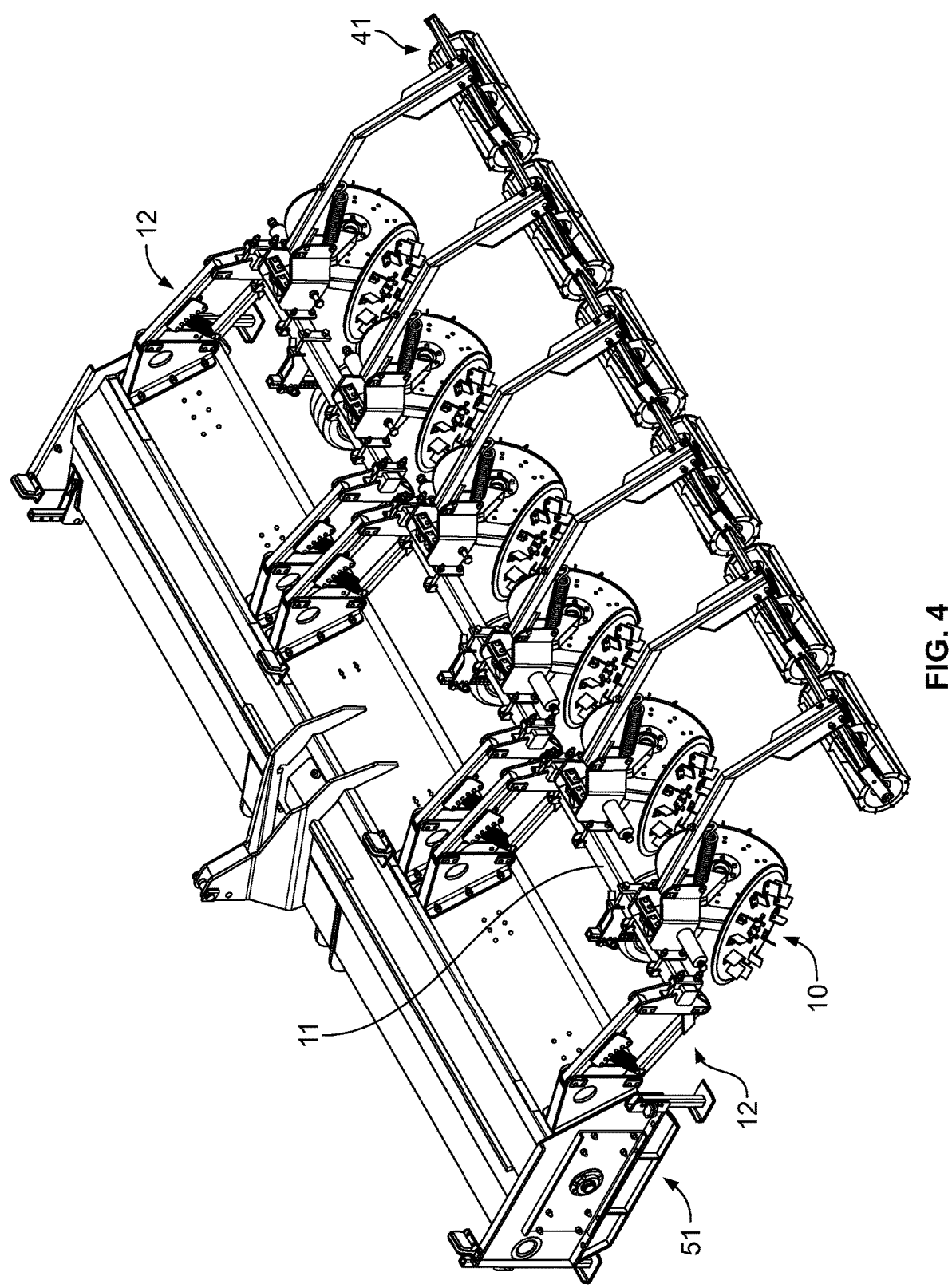
FIG. 4 is a perspective view of a single pass apparatus.
Figure 5:
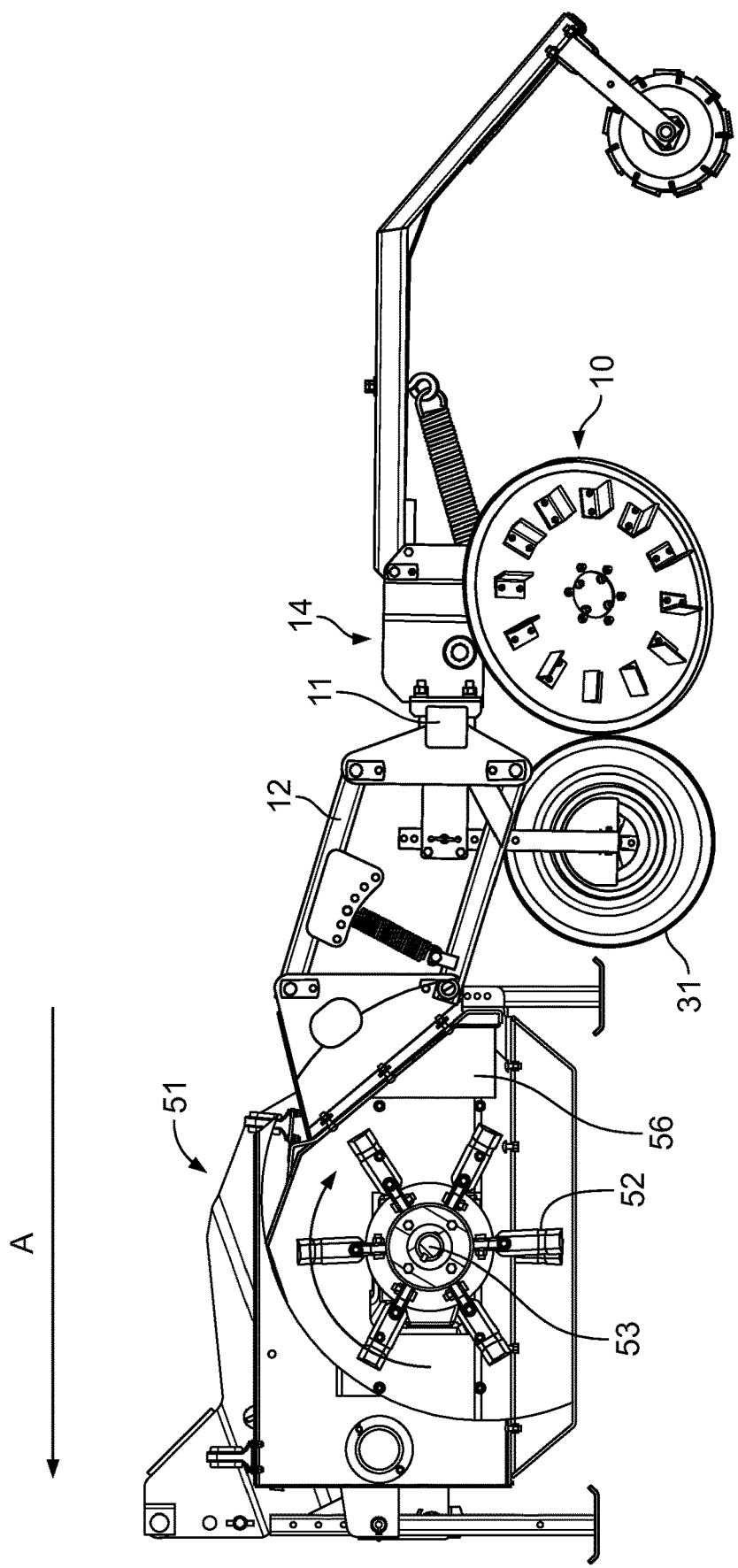
FIG. 5 is a side view of the single pass apparatus.
Figure 6:
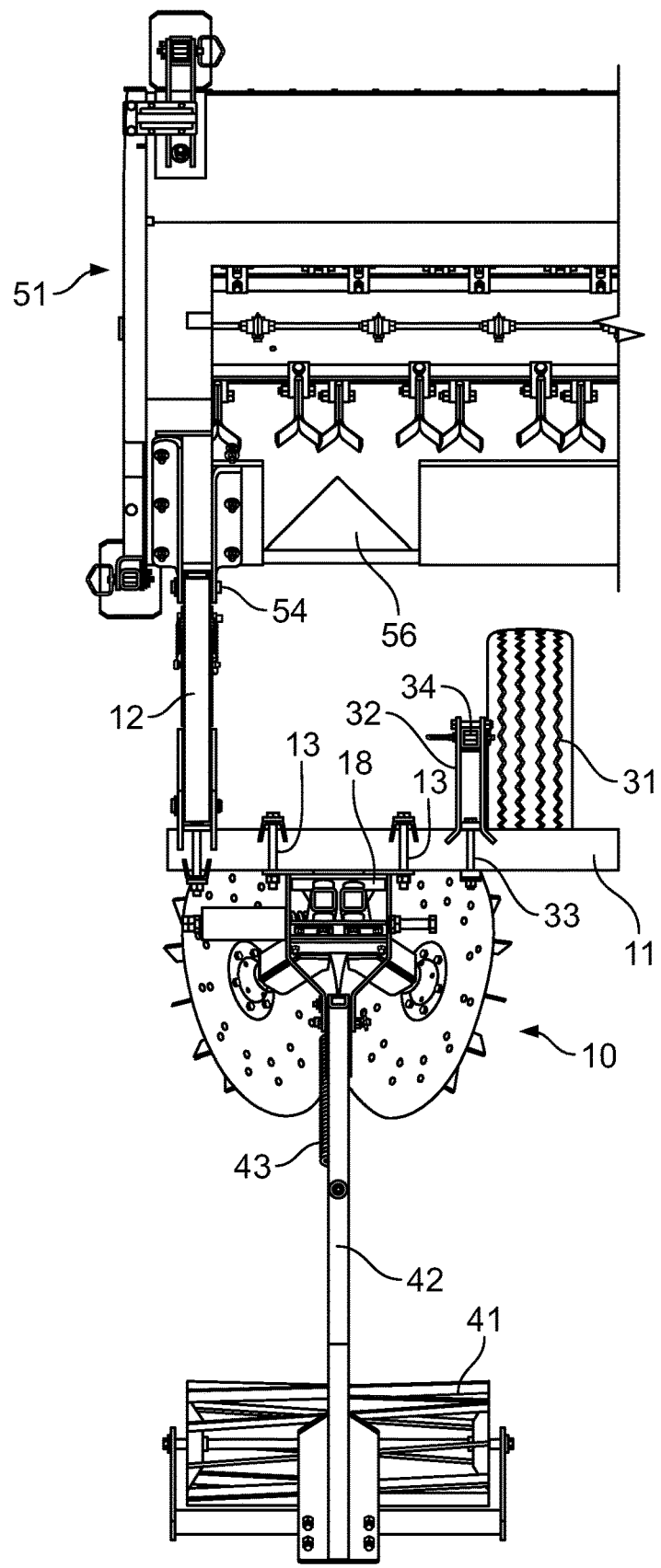
FIG. 6 is a top plan view of the embodiment shown in 5.

Even greater efficiency can be achieved by combining the stalk pullers 10 with a mower shredder as shown in FIGS. 4 to 6. Prior art devices such as shown in U.S. Pat. No. 3,770,064 have combined pullers with comminuting shredders wherein the puller was mounted in front of the comminuting shredder and was intended to disrupt the soil. We have found this to be an undesirable configuration. The wear of the shredder blades is accelerated because of the dirt on the roots and the dirt that is thrown into the cutting area by the forwardly mounted pullers. We are intentionally putting the cutting element ahead of the puller to avoid this undesirable condition. In our combination a mower/shredder 51 shreds the stalks ahead of the puller 10 using blades 52 that spin about an axis 53 transverse to the direction to travel shown by arrow A in FIG. 5. It should be understood that any suitable mower/shredder mechanism can be used for this element. The mower/shredder 51 has attachment points 54 or a bar at which linkages 12 can be attached to connect the mower/shredder 51 to the rear attachments including the disc pullers 10.

Disc pullers 10 are mounted to the rear attachment or pull bar 11. The mower/shredder 51 may carry a residue diverter 56 centered over the row and in front of the disc pullers 10 to divert loose residue away for the area where the discs 23 & 24 will be entering the ground. The diverter 56 may be a pair of vertically oriented plates, welded to each other at one end with an included angle forming a V-shape with the plates diverging ahead of the disc pullers to deflect debris. It should also be understood that the diverter can be mounted in any fashion ahead of the disc puller such as by mounting to a tool bar or to a forward mechanism. The diverters enhance the operation of the disc puller by reducing the accumulation of debris at the puller. The disc pullers 10 are calibrated with gauge wheels 31 to control the depth that the discs penetrate the ground. Finally, the discs 23 & 24 are followed by a roller basket 41 which finishes the field off. It should thus be understood that the entire mowing/shearing, stalk pulling, and smoothing operation can be accomplished in one pass by this unique combination of elements without delay occasioned by adjusting or replacing stalk pullers when they become work or broken by rocks and debris and also improving the efficiency and service life of the shredder blades. Accordingly, great savings of time and efficiency of process may be realized by incorporating my invention.

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

What we claim is:

1. An apparatus to be pulled by a prime mover for removing stalks from a field after crops have been harvested therefrom comprising:

a) a first disc rotatably mounted about an axle extending transversely to a direction of said prime mover such that said first disc engages the ground and is induced to rotate by movement of the prime mover;

b) a first disc arm with a first end of the first disc arm supporting said first disc from a connection at a second end of the first disc arm to a weldment detachably affixed to said prime mover;
c) a second disc rotatably mounted about an axle extending transversely to the direction of said prime mover such that an edge of said second disc converges with and contacts a proximal surface of said first disc near where said first disc engages the ground and such that said second disc engages the ground and rotates concomitantly with said first disc;
d) a second disc arm with a first end of the second disc arm supporting said second disc from a pivotal connection at a second end of the second disc arm to said weldment; and
e) a spring connected to said weldment and said second disc arm at a position between the first end of the second disc arm and the second end of the second disc arm for biasing said second disc toward said first disc to maintain a desired pinch point between said first disc and the second disc as said discs rotate.

2. An apparatus according to claim 1, further comprising a tensioning bolt engaged with said spring and said weldment to selectively vary a biasing force applied to said second disc arm by said spring.

3. An apparatus according to claim 2, further comprising an adjustment bolt engaged with said weldment and said first disc arm to selectively position said first disc arm to maintain said pinch point at a desired location.

4. An apparatus according to claim 1, further comprising a gauge wheel connected to said weldment and adjustable in height to maintain said pinch point at a selected depth relative to the ground.

5. An apparatus according to claim 4, further comprising a tensioning bolt engaged with said spring and said weldment to selectively vary the a biasing force applied to said second disc arm by said spring.

6. An apparatus according to claim 1, further comprising a roller basket connected to said weldment and positioned for engagement with the ground at a position rearward of said pinch point relative to a direction of travel of said prime mover.

7. An apparatus according to claim 4, further comprising a tool bar providing connection between said weldment and said prime mover.

8. An apparatus according to claim 7, wherein said tool bar provides connection between said weldment and said gauge wheel.

9. An apparatus according to claim 1, further comprising a mower connected between said prime mover and said weldment.

10. An apparatus according to claim 9, wherein said mower is connected to said weldment via a parallel linkage.

11. An apparatus according to claim 10, further comprising a roller basket connected to said weldment and positioned for engagement with the ground at a position rearward of said pinch point relative to a direction of travel of said prime mover.

12. An apparatus according to claim 9, further comprising a diverter mounted forward of said pinch point and rearward of said mower to divert debris from said mower away from said pinch point.

13. An apparatus to be pulled by a prime mover for removing stalks from a field after crops have been harvested therefrom comprising:
a) a first disc mounted for rotation about an axle extending transversely to a direction of said prime mover such that said first disc engages the ground and is induced to rotate by movement of the prime mover;
b) a first disc arm with a first end of the first disc arm supporting said first disc from a connection at a second end of the first disc arm to a mount detachably affixed to said prime mover;
c) a second disc mounted for rotation about an axle extending transversely to the direction of said prime mover such that an edge of said second disc converges with and contacts a proximal surface of said first disc near where said first disc engages the ground and such that said second disc rotates concomitantly with said first disc;
d) a second disc arm with a first end of the second disc arm supporting said second disc from a second connection at a second end of the second disc arm to said mount; and
e) at least one spring connected to said mount and to at least one of said first disc arm and second disc arm at a position between the first end of the second disc arm and the second end of the second disc arm for biasing said second disc toward said first disc to maintain a desired pinch point between said first and second disc as said discs rotate.

14. An apparatus according to claim 13, further comprising at least one tensioning bolt engaged with said at least one spring and said mount to selectively vary compression of said at least one spring.

15. An apparatus according to claim 13, further comprising a gauge wheel connected to said mount and adjustable in height to maintain said pinch point at a selected depth relative to the ground.

16. An apparatus according to claim 13, further comprising a mower connected between said prime mover and said mount.

17. An apparatus according to claim 15, further comprising a roller basket connected to said mount and positioned for engagement with the ground at a position rearward of said pinch point relative to a direction of travel of said prime mover.

18. An apparatus according to claim 16, further comprising a diverter mounted forward of said pinch point and rearward of said mower to divert debris from said mower away from said pinch point.

19. An apparatus to be pulled by a prime mover for removing stalks from a field after crops have been harvested therefrom comprising:
a) a first disc mounted for rotation about an axle extending transversely to a direction of said prime mover such that said first disc engages the ground and is induced to rotate by movement of the prime mover;
b) a first disc arm with a first end of the first disc arm supporting said first disc from a connection at a second end of the first disc arm to a mount detachably affixed to said prime mover;
c) a second disc mounted for rotation about an axle extending transversely to the direction of said prime mover such that an edge of said second disc converges with and contacts a proximal surface of said first disc near where first said disc engages the ground and such that said second disc rotates concomitantly with said first disc;
d) a second disc arm with a first end of the second disc arm supporting said second disc from a connection point on said first disc arm at a position between the first end of the first disc arm and the second end of the first disc arm; and
e) at least one spring connected to said second disc arm at a position between the first end of the second disc arm and a second end of the second disc arm and to at least one of said first disc arm and said mount for biasing said second disc toward said first disc to maintain a desired pinch point between said first and second disc as said discs rotate.

20. An apparatus according to claim 19, further comprising at least one tensioning bolt engaged with said at least one spring to selectively vary a biasing force applied to said second disc arm.

21. An apparatus according to claim 19, further comprising a gauge wheel connected to said mount and adjustable in height to maintain said pinch point at a selected depth relative to the ground.

22. An apparatus according to claim 19, further comprising a mower connected between said prime mover and said mount.

23. An apparatus according to claim 19, further comprising a roller basket connected to said mount and positioned for engagement with the ground at a position rearward of said pinch point relative to the direction of travel of said prime mover.

24. An apparatus according to claim 22, further comprising a diverter mounted forward of said pinch point and rearward of said mower to divert debris from said mower away from said pinch point.

* * * * *